United States Patent
Um

(10) Patent No.: US 10,440,449 B2
(45) Date of Patent: Oct. 8, 2019

(54) METHOD AND APPARATUS FOR SYNCHRONIZING MEDIA DATA

(71) Applicant: Samsung Electronics Co., Ltd., Gyeonggi-do (KR)

(72) Inventor: Chang-Gun Um, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/120,622

(22) PCT Filed: Dec. 22, 2014

(86) PCT No.: PCT/KR2014/012657
§ 371 (c)(1),
(2) Date: Aug. 22, 2016

(87) PCT Pub. No.: WO2015/126051
PCT Pub. Date: Aug. 27, 2015

(65) Prior Publication Data
US 2017/0013329 A1    Jan. 12, 2017

(30) Foreign Application Priority Data

Feb. 21, 2014 (KR) .................. 10-2014-0020531

(51) Int. Cl.
*H04H 60/32* (2008.01)
*H04N 21/8547* (2011.01)
*H04N 21/854* (2011.01)
*H04N 21/43* (2011.01)

(52) U.S. Cl.
CPC ..... *H04N 21/8547* (2013.01); *H04N 21/4307* (2013.01); *H04N 21/854* (2013.01)

(58) Field of Classification Search
None
See application file for complete search history.

(56) References Cited

U.S. PATENT DOCUMENTS

| 5,396,497 A | 3/1995 | Veltman |
| 6,181,383 B1 * | 1/2001 | Fox .................. H04N 21/23424 348/423.1 |
| 6,330,286 B1 * | 12/2001 | Lyons .............. H04N 21/23406 375/240.26 |
| 7,143,177 B1 | 11/2006 | Johnson et al. |
| 2011/0010623 A1 | 1/2011 | Vanslette et al. |
| 2011/0052136 A1 | 3/2011 | Homan et al. |
| 2012/0081567 A1 | 4/2012 | Cote et al. |
| 2012/0182383 A1 | 7/2012 | Kee |

OTHER PUBLICATIONS

PCT/ISA/210 Search Report issued on PCT/KR2014/012657 (pp. 3).
PCT/ISA/237 Written Opinion issued on PCT/KR2014/012657 (pp. 4).

* cited by examiner

*Primary Examiner* — James R Marandi
(74) *Attorney, Agent, or Firm* — The Farrell Law Firm, P.C.

(57) ABSTRACT

Disclosed are a method and an apparatus for synchronizing media. A method of synchronizing media includes: receiving first media data and second media data; acquiring a first time of at least a partial interval of the first media data and a second time of at least a partial interval of the second media data; controlling at least the second time based on at least a part of the first time and the second time; and combining the first media data and the second media data based on the first time and the controlled second time.

17 Claims, 10 Drawing Sheets

[Fig. 1]
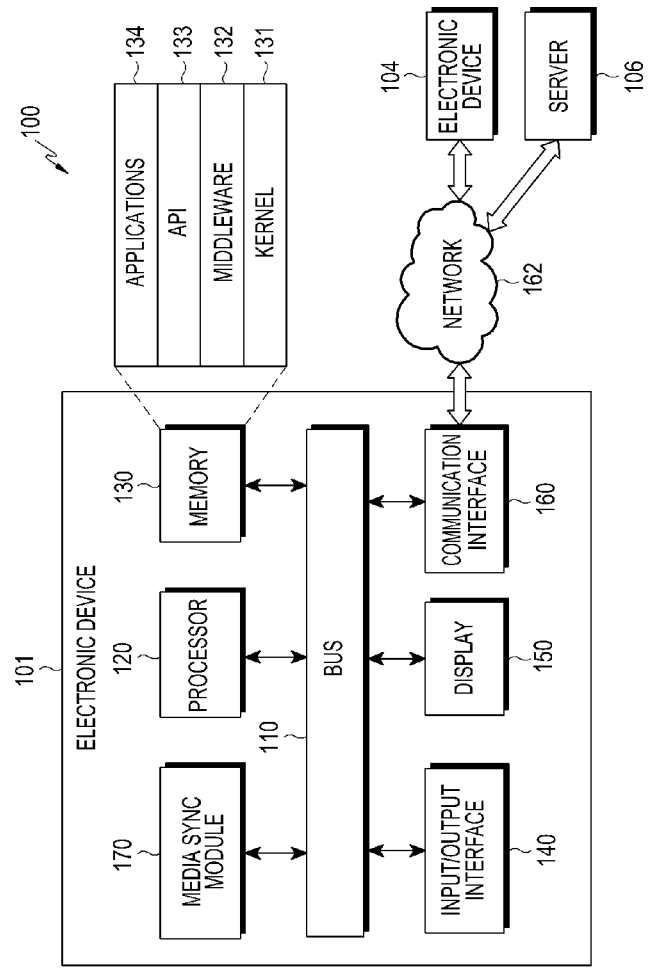
[Fig. 2]
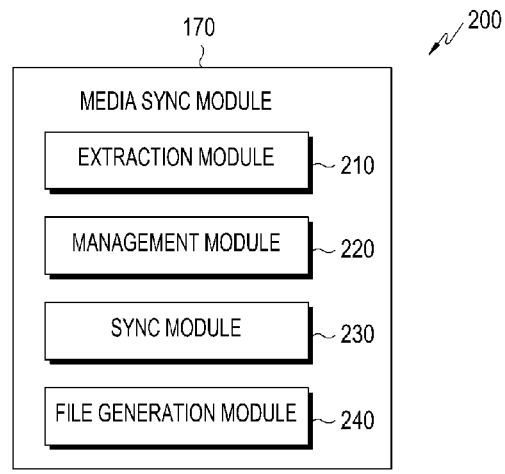

[Fig. 3]
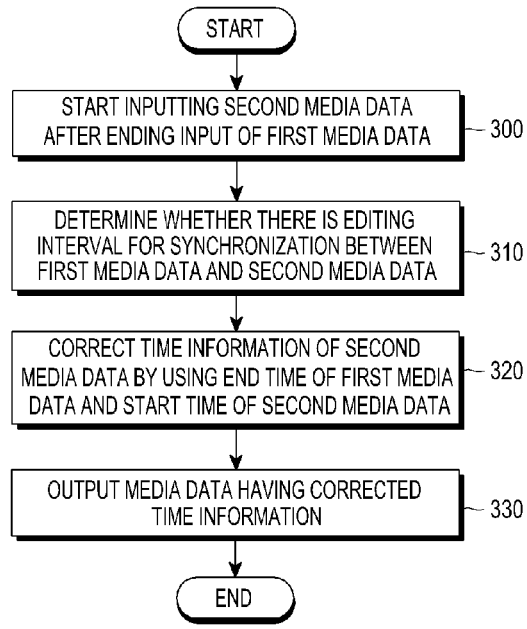
[Fig. 4]
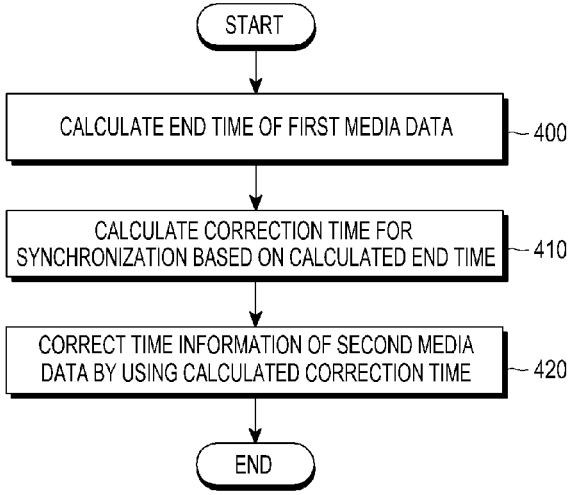

[Fig. 5A]
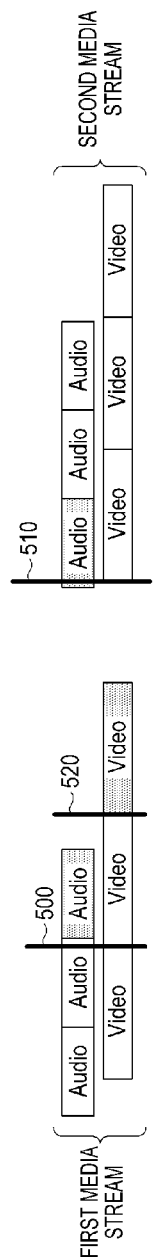

[Fig. 5B]
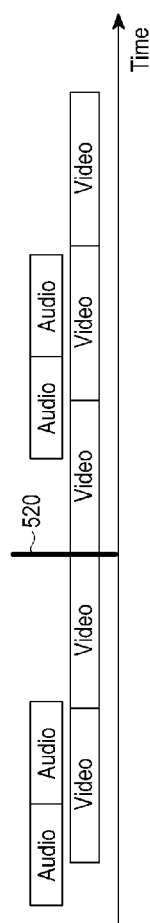

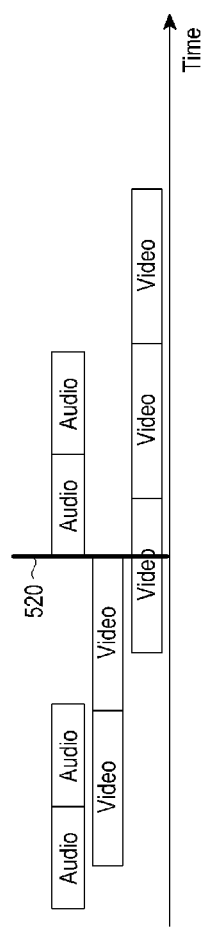
[Fig. 5C]

[Fig. 6A]
SECOND MEDIA STREAM
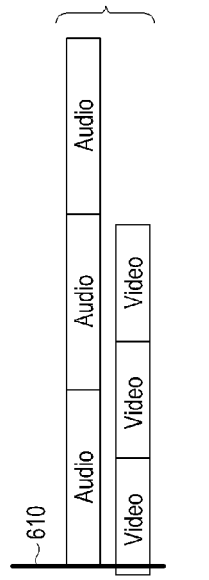
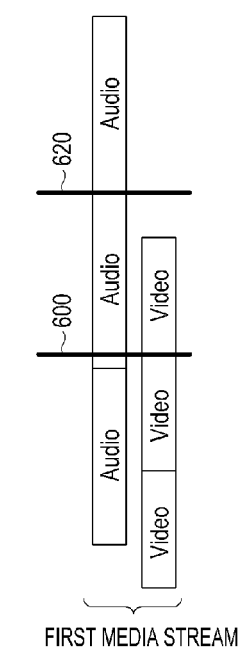
FIRST MEDIA STREAM

[Fig. 6B]
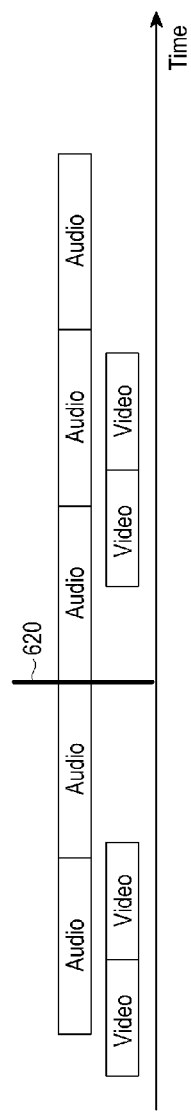

[Fig. 6C]
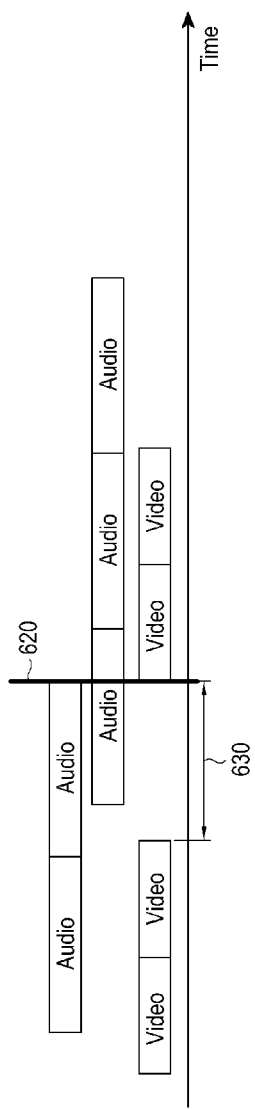

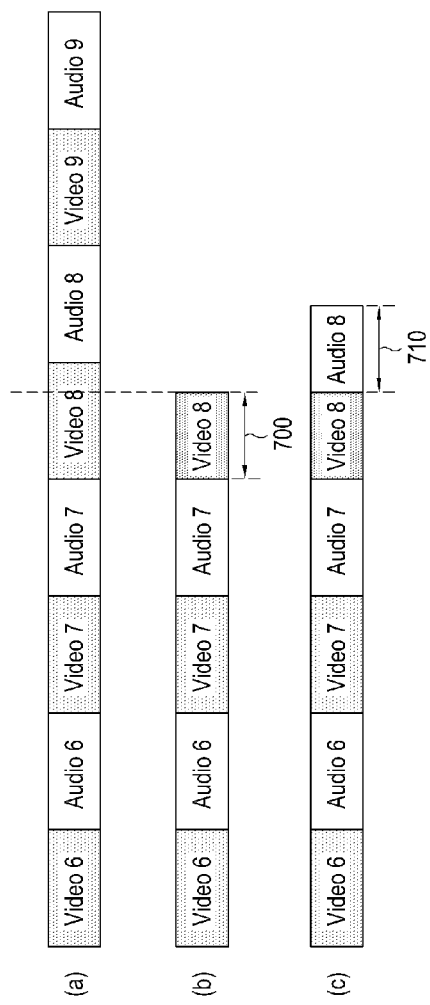
[Fig. 7]

[Fig. 8]
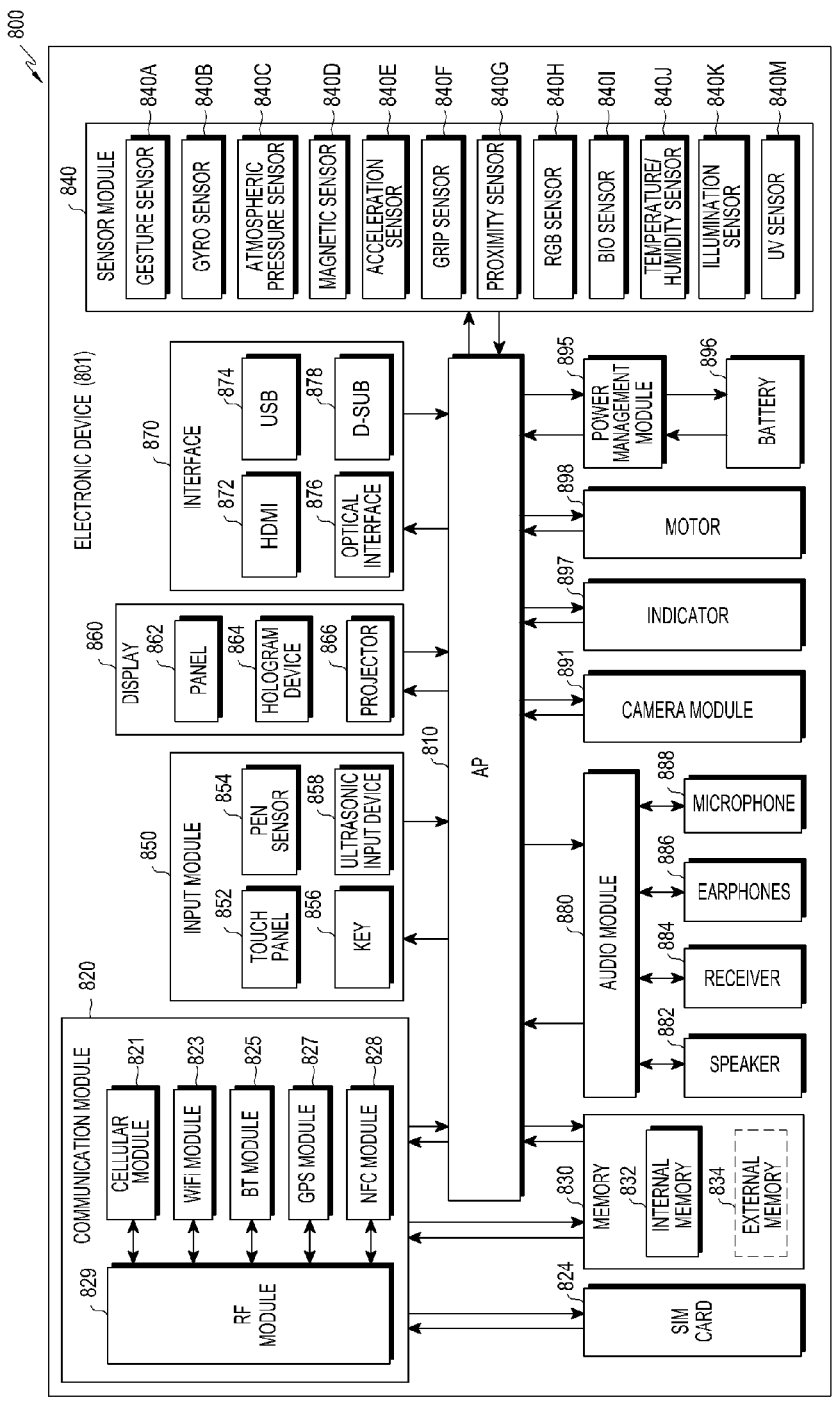

METHOD AND APPARATUS FOR SYNCHRONIZING MEDIA DATA

PRIORITY

This application is a National Phase Entry of PCT International Application No. PCT/KR2014/012657, which was filed on Dec. 22, 2014, and claims priority to Korean Patent Application No. 10-2014-0020531, which was filed on Feb. 21, 2014, the contents of each of which are incorporated herein by reference.

TECHNICAL FIELD

The present disclosure relates to a method of synchronizing media data.

BACKGROUND ART

In general, an electronic device for editing multimedia contents decodes information such as an image or voice in an editing area from a single multimedia content or a plurality of multimedia contents to be joined in the editing of the multimedia contents. The electronic device encodes information again and re-arranges the encoded information by using a conventional arrangement method such as time information, and then converts the information into file type information to generate a multimedia contents editing file.

When encoded multimedia contents are edited, if all of the contents to be edited have the same file formats as each other, such an electronic device may connect the multimedia contents without any re-encoding process, so as to generate one edited multimedia content file.

DISCLOSURE OF INVENTION

Technical Problem

As described above, the conventional electronic device may decode data to edit multimedia contents, arrange the decoded data, encode the arranged data, and then rearrange the encoded data or connect the encoded data, so as to generate an edited multimedia content file.

However, a conventional multimedia editing method has a problem in that, when the same type of multimedia contents or multimedia contents using the same codec are connected, time lengths of data within the contents are different from each other, so that some of the contents are deleted or re-arranged to match the time lengths of the data through data decoding and encoding, thereby expending a lot of system resources.

Further, the conventional multimedia editing method deteriorates multimedia content picture quality or sound quality since decoding and encoding are continuously performed.

In addition, when audio data and video data are connected, the conventional multimedia editing method may not maintain synchronization between audio and video data since the audio data and the video data have different time lengths according to a compression method and a stored file format.

Solution to Problem

Various embodiments of the present disclosure provide a method and an apparatus for synchronizing media data to maintain synchronization between audio and video data when encoded multimedia contents are connected without any decompression.

In accordance with an aspect of the present disclosure, a method of synchronizing media data is provided. The method includes: receiving first media data and second media data; acquiring a first time of at least a partial interval of the first media data and a second time of at least a partial interval of the second media data; controlling at least the second time based on at least a part of the first time and the second time; and combining the first media data and the second media data based on the first time and the controlled second time.

In accordance with another aspect of the present disclosure, a method of synchronizing media is provided. The method includes: acquiring end time information on media data; comparing the end time information with transmitted time information of the media data; and transmitting at least one of a video frame and an audio frame of the media data based on a result of the comparison.

In accordance with another aspect of the present disclosure, an electronic device is provided. The electronic device includes: a communication interface for receiving first media data and second media data; and a media sync module for acquiring a first time of at least a partial interval of the first media data and a second time of at least a partial interval of the second media data, controlling at least the second time based on at least a part of the first time and the second time, and then combining the first media data and the second media data based on the first time and the controlled second time.

In accordance with another aspect of the present disclosure, an electronic device is provided. The electronic device includes: a communication interface; and a media sync module for acquiring end time information on media data, comparing the end time information with transmitted time information of the media data, and transmitting at least one of a video frame and an audio frame of the media data through the communication interface based on a result of the comparison.

Advantageous Effects of Invention

According to various embodiments of the present disclosure, media data has no deterioration in picture quality and sound quality since encoded media data is connected without the performance of decoding and encoding, and synchronization between video data and audio data of media data can be maintained while reducing system resources.

BRIEF DESCRIPTION OF DRAWINGS

The above and other aspects, features, and advantages of the present disclosure will be more apparent from the following detailed description taken in conjunction with the accompanying drawings, in which:

FIG. 1 illustrates a network environment including an electronic device according to various embodiments;

FIG. 2 is block diagram illustrating a media sync module according to various embodiments;

FIG. 3 illustrates an operation of synchronizing media data according to various embodiments;

FIG. 4 illustrates an operation of synchronizing media data through time correction according to various embodiments;

FIG. 5A to 5C illustrate a method of synchronizing media data based on video data according to various embodiments;

FIGS. 6A to 6C illustrate a method of synchronizing media data based on audio data according to various embodiments;

FIG. 7 illustrates a method of synchronizing media data according to various embodiments; and FIG. 8 is a block diagram of an electronic device according to various embodiments.

MODE FOR THE INVENTION

Hereinafter, various embodiments of the present disclosure will be described with reference to the accompanying drawings. The present disclosure may be modified in various forms and include various embodiments, but specific examples are illustrated in the drawings and described in the description. However, the description is not intended to limit the present disclosure to the specific embodiments, and it shall be appreciated that all the changes, equivalents and substitutions belonging to the idea and technical scope of the present disclosure are included in the present disclosure. In the description of the drawings, identical or similar reference numerals are used to designate identical or similar elements.

Hereinafter, the terms "include" or "may include", which may be used in various embodiments of the present disclosure, refer to the presence of disclosed functions, operations or elements, and do not restrict the addition of one or more functions, operations or elements. Further, as used in embodiment of the present disclosure, the terms "include", "have" and their conjugates may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" in various embodiments of the disclosure means the inclusion of at least one or all of the disclosed elements. For example, the expression "A or B" may include A, may include B, or may include both A and B.

The expressions such as "first," "second," or the like used in various embodiments of the present disclosure may modify various component elements in the various embodiments but may not limit corresponding component elements. For example, the above expressions do not limit the sequence and/or importance of the corresponding elements. The expressions may be used to distinguish a component element from another component element. For example, a first user device and a second user device indicate different user devices although both of them are user devices. For example, without departing from the scope of the present disclosure, a first component element may be named a second component element. Similarly, the second component element also may be named the first component element.

It should be noted that if it is described that one component element is "coupled" or "connected" to another component element, the first component element may be directly coupled or connected to the second component, and a third component element may be "coupled" or "connected" between the first and second component elements. Conversely, when one component element is "directly coupled" or "directly connected" to another component element, it may be construed that a third component element does not exist between the first component element and the second component element.

In the present disclosure, the terms are used to describe a specific embodiment, and are not intended to limit the present disclosure. As used herein, the singular forms are intended to include the plural forms as well, unless the context clearly indicates otherwise.

Unless defined differently, all terms used herein, which include technical terminologies or scientific terminologies, have the same meaning as a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to various embodiments of the present disclosure may be a device having a camera function. For example, the electronic devices may include at least one of smart phones, tablet personal computers (PCs), mobile phones, video phones, e-book readers, desktop PCs, laptop PCs, netbook computers, personal digital assistants (PDAs), portable multimedia players (PMPs), MP3 players, mobile medical devices, cameras, wearable devices {e.g., head-mounted-devices (HMDs) such as electronic glasses}, electronic clothes, electronic bracelets, electronic necklaces, electronic appcessories, electronic tattoos, or smart watches.

According to some embodiments, the electronic device may be a smart home appliance with a camera function. The smart home appliances may include at least one of, for example, televisions, digital video disk (DVD) players, audio players, refrigerators, air conditioners, cleaners, ovens, microwaves, washing machines, air purifiers, set-top boxes, TV boxes (e.g., HomeSync™ of Samsung, Apple TV™, or Google TV™), game consoles, electronic dictionaries, electronic keys, camcorders, or electronic frames.

According to some embodiments, the electronic device may include at least one of various medical devices {e.g., a magnetic resonance angiography (MRA), a magnetic resonance imaging (MRI), a computed tomography (CT) machine, and an ultrasonic machine}, navigation devices, global positioning system (GPS) receivers, event data recorders (EDR), flight data recorders (FDR), vehicle infotainment devices, electronic devices for ships (e.g., navigation devices for ships, and gyro-compasses), avionics, security devices, automotive head units, robots for home or industry, automatic teller's machines (ATMs) in banks, or point of sales (POS) in shops.

According to some embodiments, the electronic device may include at least one of furniture or a part of a building/structure, an electronic board, an electronic signature receiving device, a projector, and various types of measuring devices (for example, a water meter, an electricity meter, a gas meter, a radio wave meter and the like) including a display control function. An electronic device according to various embodiments of the present disclosure may be a combination of one or more of above described various devices. Also, an electronic device according to various embodiments of the present disclosure may be a flexible device. Also, an electronic device according to various embodiments of the present disclosure is not limited to the above described devices.

Hereinafter, an electronic device according to various embodiments of the present disclosure will be described with reference to the accompanying drawings. In various embodiments, the term "user" may indicate a person using an electronic device or a device (e.g. an artificial intelligence electronic device) using an electronic device.

FIG. 1 illustrates a network environment 100 including an electronic device 101 according to various embodiments. Referring to FIG. 1, the electronic device 101 may include a bus 110, a processor 120, a memory 130, an input/output interface 140, a display 150, a communication interface 160, and a media sync module 170.

The bus 110 may be a circuit for connecting the above-described components with each other and transmitting communication (for example, control messages) between the above-described components.

The processor 120 may receive a command from other components (for example, the memory 130, the input/output interface 140, the display 150, the communication interface 160, or the media sync module 170) through, for example, the bus 110, analyze the received command, and perform calculation or data processing according to the analyzed command.

The memory 130 may store commands or data received from the processor 120 or other components (for example, the input/output interface 140, the display 150, the communication interface 160, or the media sync module 170) or generated by the processor 120 or other components. The memory 130 may include programming modules such as a kernel 131, a middleware 132, an Application Programming Interface (API) 133, applications 134, and the like. Each of the programming modules described above may be formed of software, firmware, and hardware, or a combination thereof.

The kernel 131 may control or manage system resources (for example, the bus 110, the processor 120, the memory 130 or the like) which are used for performing operations or functions implemented by other programming modules, for example, the middleware 132, the API 133 or the application 134. Further, the kernel 131 may provide an interface through which the middleware 132, the API 133, or the applications 134 may access individual components of the electronic device 101 to control or manage them.

The middleware 132 may serve as an intermediary such that the API 133 or the application 134 communicates with the kernel 131 to transmit/receive data. Further, in relation to requests for an operation received from the application 134, the middleware 132 may control (for example, scheduling or load-balancing) the requests for the operation by using, for example, a method of assigning a priority by which system resources (for example, the bus 110, the processor 120, the memory 130, or the like) of the electronic device 101 can be used for at least one of the applications 134.

The API 133 is an interface by which the applications 134 control functions provided from the kernel 131 or the middleware 132, and may include, for example, at least one interface or function (for example, commands) for file control, window control, image processing, or text control.

According to various embodiments, the applications 134 may include a Short Message Service (SMS)/Multimedia Message Service (MMS) application, an e-mail application, a calendar application, an alarm application, a health care application (for example, an application for measuring an amount of exercise or blood sugar), and an environmental information application (for example, an application for providing atmospheric pressure, humidity, temperature, and the like). Additionally or alternately, the applications 134 may include an application related to an information exchange between the electronic device 101 and an external electronic device (for example, an electronic device 104). The application related to the information exchange may include, for example, a notification relay application for transmitting specific information to the external electronic device, or a device management application for managing the external electronic device.

For example, the notification relay application may include a function of transferring notification information generated in other applications (for example, the SMS/MMS application, the e-mail application, the health care application, or the environmental information application) of the electronic device 101 to an external electronic device (for example, the electronic device 104). Additionally or alternatively, the notification relay application may receive notification information from, for example, an external electronic device (for example, the electronic device 104), and provide the same to a user. The device management application may manage (for example, install, delete, or update), for example, at least some functions (for example, turning external electronic device (or some elements) on or off, or adjusting the brightness (or resolution) of a display) of an external electronic device (for example, the electronic device 104) that communicates with the electronic device 101, applications performed in the external electronic device, or services (for example, a phone call service, or a messaging service) provided in the external electronic device.

According to various embodiments, the applications 134 may include applications, which are designated according to attributes (for example, the type of electronic device) of the external electronic device (for example, the electronic device 104). For example, in a case where the external electronic device is an MP3 player, the applications 134 may include an application related to the reproduction of music. Similarly, in a case where the external electronic device is a mobile medical appliance, the applications 134 may include an application related to health care. According to an embodiment, the applications 134 may include at least one of an application designated for the electronic device 101 or an application received from external electronic devices (for example, a server 106, or an electronic device 104).

The input/output interface 140 may transfer commands or data input from a user through an input/output device (for example, a sensor, a keyboard, or a touch screen) to, for example, the processor 120, the memory 130, the communication interface 160, or the media sync module 170 through the bus 110. For example, the input/output interface 140 may provide the processor 120 with data for a user's touch which is input through the touch screen. Further, through the input/output device (for example, a speaker or a display), the input/output interface 140 may output commands or data received from the processor 120, the memory 130, the communication interface 160, or the media sync module 170 through the bus 110. For example, the input/output interface 140 may output voice data processed through the processor 120 to a user through a speaker.

The display 150 may display various pieces of information (for example, multimedia data or text data) to a user.

The communication interface 160 may connect communication between the electronic device 101 and an external electronic device (for example, the electronic device 104 or the server 106). For example, the communication interface 160 may be connected to a network 162 through wireless or wired communication to communicate with the external device. The wireless communication may include at least one of, for example, Wi-Fi, Bluetooth (BT), Near Field Communication (NFC), Global Positioning System (GPS) and cellular communication (for example, Long Term Evolution (LTE), LTE-A, Code Division Multiple Access (CDMA), Wideband CDMA (WCDMA), Universal Mobile Telecommunication System (UMTS), Wireless Broadband (WiBro), Global System for Mobile communication (GSM), and the like the like). The wired communication may include at least one of, for example, a Universal Serial Bus (USB), a High Definition Multimedia Interface (HDMI), Recommended Standard 232 (RS-232), and a Plain Old Telephone Service (POTS).

According to an embodiment, the network 162 may be a telecommunication network. The communication network may include at least one of a computer network, the Internet, the Internet of things, and a telephone network. According to an embodiment of the present disclosure, a protocol (for example, a transport lay protocol, data link layer protocol, or a physical layer protocol) for communication between the electronic device 101 and the external device may be supported by at least one of the applications 134, the application programming interface 133, the middleware 132, the kernel 131, the communication interface 160, and the media sync module 170.

The media sync module 170 may process at least a part of information obtained from other components (for example, the processor 120, the memory 130, or the communication interface 160) and provide the processed information to the user in various ways. For example, the media sync module 170 may control at least some functions of the electronic device 101 such that the electronic device 101 synchronizes a plurality of pieces of media data input from the communication interface 160 by using the processor 120 or independently from the processor 120.

FIG. 2 is a block diagram 200 of the media sync module 170 of the electronic device (for example, the electronic device 101 (of FIG. 1)) according to various embodiments.

Referring to FIG. 2, the media sync module 170 may include an extraction module 210, a management module 220, a sync module 230, and a file generation module 240.

The extraction module 210 may extract audio and video data from, for example, input multimedia data. At this time, the multimedia data may be input in real time through the communication interface 160 or may be stored in the memory 130 and input into the extraction module 210.

According to an embodiment, when an input for first media data ends and an input for second media data starts, the extraction module 210 stops extracting audio and video data from the first media data and starts extracting audio and video data from the second media data.

The management module 220 may manage the audio and video data extracted by the extraction module 210.

The sync module 230 may synchronize the audio and video data extracted by the extraction module 210. According to an embodiment, the sync module 230 may acquire a first time of at least a partial interval of the first media data and a second time of at least a partial interval of the second media data, and control at least the second time based on at least the part of the first time and the second time. At this time, the first time may be an end time of the first media data and the second time may be a start time of the second media data. As described above, in controlling the second time, the sync module 230 may also control information on another time of the second media data by controlling the start time of the second media data.

For example, when the input for the first media data ends and the input for the second media data starts, the sync module 230 determines whether an editing interval exists for connecting a last frame of the first media data and a beginning frame of the second media data. When there is the editing interval, the sync module 230 extracts time information of a last audio frame and a last video frame of the first media data within the editing interval and extracts time information of a beginning audio frame and a beginning video frame of the second media data.

According to another embodiment, the sync module 230 calculates an end time of the first media data within the editing interval and calculates a difference value between a start time of the second media data and the calculated end time of the first media data. At this time, the end time may include a time when an output of the audio frame or the video frame ends. For example, the end time may be a time when the output of the video frame ends and a time when the output of the audio frame ends through the display 150. The end time of the first media data may be a larger value between a value generated by adding a length of the audio frame to the start time of the last audio frame of the first media data and a value generated by adding a length of the video frame to the start time of the last video frame of the first media data.

According to another embodiment, the sync module 230 may reflect the calculated difference value in a display start time of the second media data to synchronize an end frame of the first media data and a start frame of the second media data within the editing interval. At this time, the display start time of the second media data may be a start time when an output of a start video frame of the second media data starts and is displayed or a start time when an output of a start audio frame of the second media data starts. For example, the sync module 230 may correct the start time of the second media data to be the end time of the first media data by moving the display start time of the second media data by the calculated difference value. Accordingly, while the start time of the second media data is corrected to be the end time of the first media data, the time information of the second media data may also be corrected to correspond to the corrected start time. The file generation module 240 may generate multimedia contents in which the first media data and the second media data are combined based on the first time and the controlled second time, for example, multimedia data including audio and video data which have been synchronized.

According to an embodiment of the present disclosure to achieve the above description, the electronic device 101 may include a communication interface for receiving first media data and second media data and a media sync module for acquiring a first time of at least a partial interval of the first media data and a second time of at least a partial interval of the second media data, controlling the second time based on at least a part of the first time and the second time, and then combining the first media data and the second media data based on the first time and the controlled second time.

FIG. 3 illustrates an operation of synchronizing media data according to various embodiments.

Referring to FIG. 3, in step 300, the communication interface 160 may end an input for first media data and starts an input for second media data.

In step 310, the media sync module 170 may determine whether an editing interval exists for connecting a last frame of the first media data and a start frame of the second media data.

When the editing interval exists, the media sync module 170 may correct time information of the second media data by using an end time of the first media data and a start time of the second media data.

In step 330, the media sync module 170 may output media data in which the time information within the editing interval is corrected. At this time, the media data having the corrected time information may refer to media data in which the first media data and the second media data are connected through the correction of the time information of the second media data by using a corrected value extracted through the end time of the first media data and the start time of the second media data.

FIG. 4 illustrates an operation of synchronizing media data through time correction according to various embodiments. At this time, FIG. 4 describes step 320 of FIG. 3 in detail.

In step 400, the media sync module 170 may calculate the end time of the first media data. For example, when a length of the video data of the first media data is longer than or equal to a length of the audio data of the first media data, the end time of the first media data may be the end time of the last video frame of the first media data. Further, when a length of the audio data of the first media data is longer than or equal to a length of the video data of the first media data, the end time of the first media data may be the end time of the last audio frame of the first media data.

In step 410, the media sync module 170 may calculate a correction time for synchronization based on the calculated end time of the first media data. For example, when video data of the second media data is first received, the media sync module 170 may calculate a difference value between the start time of the video data of the second media data and the end time of the first media data as a correction time. Further, when audio data of the second media data is first received, the media sync module 170 may calculate a difference value between the start time of the audio data of the second media data and the end time of the first media data as a correction time.

In step 420, the media sync module 170 may correct time information of the second media data by using the calculated correction time. For example, when video data of the second media data is first received, the media sync module 170 may correct a start time of the video data of the second media data to be the end time of the first media data. Further, when audio data of the second media data is first received, the media sync module 170 may correct a start time of the audio data of the second media data to be the end time of the first media data.

According to embodiments of the present disclosure, a method of synchronizing media data may include receiving first media data and second media data; acquiring a first time of at least a partial interval of the first media data and a second time of at least a partial interval of the second media data; controlling the second time based on at least the part of the first time and the second time; and combining the first media data and the second media data based on the first time and the controlled second time.

FIGS. 5A to 5C illustrate a method of synchronizing media data based on video data according to various embodiments.

As illustrated in FIG. 5A, when reception of first media data ends and reception of second media data starts, if a length of video data of the first media data is longer than or equal to a length of audio data of the first media data in a transmission end time 500 of the first media data, the media sync module 170 may extract an end time of a last video frame of the first media data as an end time 520 of the first media data.

When video data of the second media data is first received, the media sync module 170 may correct a start time of a start video frame of the second media data to be the end time 520 of the first media data as illustrated in FIG. 5B.

When audio data of the second media data is first received, the media sync module 170 may correct a start time of a start audio frame of the second media data to be the end time 520 of the first media data as illustrated in FIG. 5C.

FIGS. 6A to 6C illustrate a method of synchronizing media data based on audio data according to various embodiments.

As illustrated in FIG. 6A, when reception of first media data ends and reception of second media data starts, if a length of audio data of the first media data is longer than or equal to a length of video data of the first media data in a transmission end time 600 of the first media data, the media sync module 170 may extract an end time of a last audio frame of the first media data as an end time 620 of the first media data.

When audio data of the second media data is first received, the media sync module 170 may correct a start time of a start audio frame of the second media data to be the end time of the first media data as illustrated in FIG. 6B.

When video data of the second media data is first received, the media sync module 170 may correct a start time of a start video frame of the second media data to be the end time of the first media data as illustrated in FIG. 6C.

FIG. 7 illustrates a method of synchronizing media data according to various embodiments.

According to FIG. 7, an electronic device on a receiving side may transmit an event of making a request for ending transmission of media data to an electronic device on a transmitting side at a time when media data video 7 and audio 7 have been completely received while the electronic device on the receiving side receives media data from the electronic device on the transmitting side as illustrated in (a) of FIG. 7. When the electronic device on the transmitting side additionally transmits video data video #8 700 after a network delay as illustrated in (b) of FIG. 7 and then receives the event of making the request for ending the transmission, a last time of video #8 700 which has been additionally transmitted may be determined as an end time of the media data. As illustrated in (c) of FIG. 7, the electronic device on the transmitting side may additionally transmit audio #8 710 having the same length as that of video #8 700 which has been additionally transmitted.

According to an embodiment of the present disclosure to achieve the above description, the electronic device 101 may include a communication interface and a media sync module for acquiring end time information on media data, comparing the end time information with transmitted time information of the media data, and transmitting at least one of a video frame and an audio frame of the media data through the communication interface based on a result of the comparison.

Further, according to embodiments of the present disclosure, a method of synchronizing media data may include: acquiring end time information on media data; comparing the end time information with transmitted time information of the media data; and transmitting at least one of a video frame and an audio frame of the media data based on a result of the comparison.

FIG. 8 is a block diagram 800 of an electronic device 801 according to various embodiments. The electronic device 801 may configure, for example, all or a part of the electronic device 101 shown in FIG. 1. Referring to FIG. 8, the electronic device 801 may include one or more Application Processors (APs) 810, a communication module 820, a Subscriber Identifier Module (SIM) card 824, a memory 830, a sensor module 840, an input module 850, a display 860, an interface 870, an audio module 880, a camera module 891, a power management module 895, a battery 896, an indicator 897, and a motor 898.

The AP 810 may control a plurality of hardware or software components connected to the AP 810 by driving an operating system or an application program, process various types of data including multimedia data, and perform calculations. The AP 810 may be implemented by, for example, a System on Chip (SoC). According to an embodiment, the AP 810 may further include a Graphic Processing Unit (GPU).

The communication module 820 (for example, communication interface 160) may transmit/receive data through communication between different electronic devices (for example, the electronic device 104 or the server 106) connected to the electronic device 801 through a network. According to an embodiment, the communication module 820 may include a cellular module 821, a Wi-Fi module 823, a BT module 825, a GPS module 827, an NFC module 828, and a Radio Frequency (RF) module 829.

The cellular module 821 may provide a voice call, a video call, a Short Message Service (SMS), or an Internet service through a communication network (for example, Long Term Evolution (LTE), LTE-A, Code Division Multiple Access (CDMA), Wideband CDMA (WCDMA), UMTS, WiBro, GSM or the like). Further, the cellular module 821 may distinguish and authenticate electronic devices within a communication network using a subscriber identification module (for example, the SIM card 824). According to an embodiment, the cellular module 821 may perform at least some of the functions which can be provided by the AP 810. For example, the cellular module 821 may perform at least a part of a multimedia control function.

According to an embodiment, the cellular module 821 may include a Communication Processor (CP). Further, the cellular module 821 may be implemented by, for example, an SoC. Although the cellular module 821 (for example, the communication processor), the memory 830, and the power management module 895 are illustrated as components separated from the AP 810 in FIG. 8, the AP 810 may be implemented to include at least some of the above described components (for example, the cellular module 821) according to one embodiment.

According to an embodiment, the AP 810 or the cellular module 821 (for example, communication processor) may load a command or data received from at least one of a non-volatile memory and other components connected to each of the AP 810 and the cellular module 821 to a volatile memory and process the loaded command or data. Further, the AP 810 or the cellular module 821 may store data received from at least one of other components or created by at least one of other components in a non-volatile memory.

Each of the Wi-Fi module 823, the BT module 825, the GPS module 827, and the NFC module 828 may include, for example, a processor for processing data transmitted/received through the corresponding module. Although the cellular module 821, the WiFi module 823, the BT module 825, the GPS module 827, and the NFC module 828 are illustrated as blocks separated from each other in FIG. 8, at least some (for example, two or more) of the cellular module 821, the WiFi module 823, the BT module 825, the GPS module 827, and the NFC module 828 may be included in one Integrated Chip (IC) or one IC package. For example, at least some (for example, a communication processor corresponding to the cellular module 821 and a WiFi processor corresponding to the WiFi module 823) of the processors corresponding to the cellular module 821, the WiFi module 823, the BT module 825, the GPS module 827, and the NFC module 828 may be implemented by one SoC.

The RF module 829 may transmit/receive data, for example, an RF signal. Although not illustrated, the RF module 829 may include, for example, a transceiver, a Power Amp Module (PAM), a frequency filter, a Low Noise Amplifier (LNA), or the like. Further, the RF module 829 may further include a component, such as a conductor, a conductive wire or the like, for transmitting/receiving an electromagnetic wave over a free space in wireless communication. Although the cellular module 821, the Wi-Fi module 823, the BT module 825, the GPS module 827, and the NFC module 828 are illustrated to share one RF module 829 in FIG. 8, at least one of the cellular module 821, at least one of the Wi-Fi module 823, the BT module 825, the GPS module 827, and the NFC module 828 may transmit/receive the RF signal through a separate RF module.

The SIM card 824 may be a card including a subscriber identification module, and may be inserted into a slot formed in a particular portion of the electronic device. The SIM card 824 may include unique identification information (for example, Integrated Circuit Card IDentifier (ICCID)) or subscriber information (for example, International Mobile Subscriber Identity (IMSI)).

The memory 830 (for example, memory 130) may include an internal memory 832 or an external memory 834. The internal memory 832 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, and the like).

According to an embodiment, the internal memory 832 may be a Solid State Drive (SSD). The external memory 834 may further include a flash drive, for example, a Compact Flash (CF), a Secure Digital (SD), a Micro Secure Digital (Micro-SD), a Mini Secure Digital (Mini-SD), an extreme Digital (xD), a memory stick or the like. The external memory 834 may be functionally connected to the electronic device 801 through various interfaces. According to an embodiment, the electronic device 801 may further include a storage device (or storage medium) such as a hard drive.

The sensor module 840 may measure a physical quantity or detect an operation state of the electronic device 801, and may convert the measured or detected information to an electronic signal. The sensor module 840 may include, for example, at least one of a gesture sensor 840A, a gyro sensor 840B, an atmospheric pressure sensor 840C, a magnetic sensor 840D, an acceleration sensor 840E, a grip sensor 840F, a proximity sensor 840G, a color sensor 840H (for example, red, green, and blue (RGB) sensor), a biometric sensor 840I, a temperature/humidity sensor 840J, an illumination sensor 840K, and an Ultra Violet (UV) sensor 840M. Additionally or alternatively, the sensor module 840 may include, for example, an E-nose sensor (not illustrated), an ElectroMyoGraphy (EMG) sensor (not illustrated), an ElectroEncephaloGram (EEG) sensor (not illustrated), an ElectroCardioGram (ECG) sensor (not illustrated), an InfraRed (IR) sensor, an iris sensor (not illustrated), a fingerprint sensor (not illustrated) and the like. The sensor module 840 may further include a control circuit for controlling one or more sensors included therein.

The input module 850 may include a touch panel 852, a (digital) pen sensor 854, a key 856, or an ultrasonic input device 858. The touch panel 852 may recognize a touch input through at least one of, for example, a capacitive type, a resistive type, an infrared type, and an ultrasonic type. The touch panel 852 may further include a control circuit. The capacitive type touch panel may recognize physical contact or proximity. The touch panel 852 may further include a tactile layer. In this case, the touch panel 852 may provide a tactile reaction to a user.

The (digital) pen sensor 854 may be implemented, for example, using a method identical or similar to a method of receiving a touch input of a user, or using a separate recognition sheet. The key 856 may include, for example, a physical button, an optical key or a keypad. The ultrasonic input device 858 is a device which can detect an acoustic wave by a microphone (for example, microphone 888) of the electronic device 801 through an input tool generating an ultrasonic signal to identify data and can perform wireless recognition. According to an embodiment, the electronic device 801 may receive a user input from an external device (for example, computer or server) connected to the electronic device 801 by using the communication module 820.

The display 860 (for example, the display 150) may include a panel 862, a hologram device 864, and a projector 866. The panel 862 may be, for example, a Liquid Crystal Display (LCD), Active-Matrix Organic Light Emitting Diode (AM-OLED), or the like. The panel 862 may be implemented to be, for example, flexible, transparent, or wearable. The panel 862 may be also implemented by one module together with the touch panel 852. The hologram device 864 may show a stereoscopic image in the air by using light interference. The projector 866 may project light onto a screen to display an image. For example, the screen may be located inside or outside the electronic device 801. According to one embodiment, the display 860 may further include a control circuit for controlling the panel 862, the hologram device 864, or the projector 866.

The interface 870 may include, for example, a High-Definition Multimedia Interface (HDMI) 872, a Universal Serial Bus (USB) 874, an optical interface 876, or a D-sub-miniature (D-sub) 878. The interface 870 may be included in, for example, the communication interface 160 illustrated in FIG. 1. Additionally or alternatively, the interface 290 may include, for example, a Mobile High-definition Link (MHL) interface, a Secure Digital (SD) card/Multi-Media Card (MMC) interface, or an Infrared Data Association (IrDA) standard interface.

The audio module 880 may bidirectionally convert a sound and an electrical signal. At least some components of the audio module 880 may be included in, for example, the input/output interface 140 illustrated in FIG. 1. The audio module 880 may process voice information input or output through, for example, a speaker 882, a receiver 884, earphones 886, the microphone 888 or the like.

The camera module 891 is a device which can photograph an image and a dynamic image. According to an embodiment, the camera module 291 may include one or more image sensors (for example, a front lens or a back lens), a lens (not shown), an Image Signal Processor (ISP) (not shown) or a flash (not shown) (for example, LED or xenon lamp).

The power management module 895 may manage power of the electronic device 801. Although not illustrated, the power management module 895 may include, for example, a Power Management Integrated Circuit (PMIC), a charger Integrated Circuit (IC), or a battery or fuel gauge.

The PMIC may be mounted to, for example, an integrated circuit or an SoC semi-conductor. Charging methods may be classified into a wired charging method and a wireless charging method. The charger IC may charge a battery and prevent over voltage or over current from flowing from a charger. According to an embodiment, the charger IC may include a charger IC for at least one of the wired charging method and the wireless charging method. A magnetic resonance scheme, a magnetic induction scheme, or an electromagnetic scheme may be exemplified as the wireless charging method, and an additional circuit for wireless charging, such as a coil loop circuit, a resonance circuit, a rectifier circuit, and the like may be added.

The battery gauge may measure, for example, a remaining quantity of the battery 896, or a voltage, a current, or a temperature during the charging. The battery 896 may store or generate electricity, and may supply power to the electronic device 801 using the stored or generated electricity. The battery 896 may include, for example, a rechargeable battery or a solar battery.

The indicator 897 may show particular statuses of the electronic device 801 or a part (for example, AP 810) of the electronic device 801, for example, a booting status, a message status, a charging status and the like. The motor 898 may convert an electrical signal to a mechanical vibration. Although not illustrated, the electronic device 801 may include a processing unit (for example, GPU) for mobile TV support. The processing unit for supporting the mobile TV may process media data according to a standard of Digital Multimedia Broadcasting (DMB), Digital Video Broadcasting (DVB), media flow or the like.

The above described components of the electronic device according to various embodiments of the present disclosure may be formed of one or more components, and a name of a corresponding component may be changed based on the type of electronic device. The electronic device according to the present disclosure may include one or more of the aforementioned components or may further include other additional components, or some of the aforementioned components may be omitted. Further, some of the components of the electronic device according to the various embodiments of the present disclosure may be combined to form a single entity, and thus, may equivalently execute functions of the corresponding components prior to the combination.

The above described components of the electronic device according to various embodiments of the present disclosure may be formed of one or more components, and a name of a corresponding component may be changed based on the type of electronic device. The electronic device according to the present disclosure may include one or more of the aforementioned components or may further include other additional components, or some of the aforementioned components may be omitted. Further, some of the components of the electronic device according to the various embodiments of the present disclosure may be combined to form a single entity, and thus, may equivalently execute functions of the corresponding component prior to the combination.

The term "module" used in the various embodiments of the present disclosure may refer to, for example, a unit including a combination of one or more of hardware, software, and firmware. The "module" may be interchangeable with a term, such as a unit, a logic, a logical block, a component, or a circuit. The "module" may be the smallest unit of an integrated component or a part thereof. The "module" may be a minimum unit for performing one or more functions or a part thereof. The "module" may be mechanically or electronically implemented. For example, the "module" according to the various embodiments of the present disclosure may include at least one of an Application-Specific Integrated Circuit (ASIC) chip, a Field-Programmable Gate Arrays (FPGA), and a programmable-logic device for performing operations which have been known or are to be developed hereinafter.

According to various embodiments, at least a part of the device (for example, modules or functions thereof) or the method (for example, operations) according to the various embodiments of the present disclosure may be implemented by, for example, a command stored in a computer-readable storage medium provided in a form of a programming module. When the command is executed by one or more processors (for example, the processor 210), the one or more processors may perform a function corresponding to the command. The computer-readable storage medium may be, for example, the memory 220. At least a part of the programming module may be implemented (for example, executed) by, for example, the processor 210. At least a part of the programming module may include, for example, a module, a program, a routine, a set of instructions and/or a process for performing one or more functions.

The computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction (for example, programming module), such as a Read Only Memory (ROM), a Random Access Memory (RAM), a flash memory and the like. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

A module or a programming module according to various embodiments of the present disclosure may include at least one of the described components, a few of the components may be omitted, or additional components may be included. Operations executed by a module, a programming module, or other components according to various embodiments of the present disclosure may be executed sequentially, in parallel, repeatedly, or in a heuristic manner. Further, some operations may be executed according to another order or may be omitted, or other operations may be added.

According to various embodiments, a storage medium for storing commands is provided. The commands are configured to allow one or more processors to perform one or more operations when being executed by the one or more processors, the one or more operations including: an operation for receiving first media data and second media data; an operation for acquiring a first time of at least a partial interval of the first media data and a second time of at least a partial interval of the second media data; and operation for controlling at least the second time based on at least the part of the first time and the second time; and an operation for combining the first media data and the second media data based on the first time and the controlled second time.

The one or more operations according to another embodiment may include an operation for acquiring end time information on media data; an operation for comparing the end time information with transmitted time information of the media data; and an operation for transmitting at least one of a video frame and an audio frame of the media data based on a result of the comparison.

Embodiments of the present disclosure provided in the present specifications and drawings are merely certain examples to readily describe the technology associated with embodiments of the present disclosure and to help understanding of the embodiments of the present disclosure, but may not limit the scope of the embodiments of the present disclosure. Therefore, in addition to the embodiments disclosed herein, the scope of the various embodiments of the present disclosure should be construed to include all modifications or modified forms drawn based on the technical idea of the various embodiments of the present disclosure.

The invention claimed is:

1. A method of synchronizing media data, the method comprising:
   receiving first media data and second media data;
   identifying a first time of the first media data and a second time of the second media data, wherein the identified first time is a time when an output of one part among video data and audio data of the first media data which ends later ends, and the identified second time is a time when an output of one part among video data and audio data of the second media data which is received earlier starts;
   modifying the identified second time of the second media data to be the identified first time of the first media data; and
   combining the first media data and the second media data to output the one part of the second media data which is received earlier, at the modified second time upon the output of the one part of the first media data which ends later.

2. The method of claim 1, wherein the modifying of the identified second time comprises modifying time information of the identified second time of the second media data to be time information of the identified first time of the first media data.

3. The method of claim 1, wherein the identifying of the first time comprises calculating a first end time of the first media data when an output of the audio data of the first media data ends and a second end time of the first media data when an output of the video data of the first media data ends; and
   wherein the modifying of the identified second time comprises modifying time information of the identified second time of the second media data based on the calculated first end time or the calculated second end time.

4. The method of claim 3, wherein the identifying of the first time of the first media data comprises identifying of the first time having a larger value among the first end time generated by adding an audio frame length to a start time of a last audio frame of the first media data and the second end time generated by adding a video frame length to a start time of a last video frame of the first media data.

5. The method of claim 3, wherein the calculating of the second end time of the first media data comprises calculating an end time of a last video frame of the first media data when a video data length of the first media data is longer than or equal to an audio data length of the first media data.

6. The method of claim 3, wherein the calculating of the first end time of the first media data comprises calculating an end time of a last audio frame of the first media data when an audio data length of the first media data is longer than or equal to a video data length of the first media data.

7. The method of claim 3, wherein the modifying of the time information of the identified second time of the second media data comprises, when the video data of the second media data is first received, modifying time information of a start time of the received video data of the second media data to be the calculated first end time or the calculated second end time of the first media data.

8. The method of claim 3, wherein the modifying of the time information of the identified second time of the second media data comprises, when the audio data of the second media data is first received, modifying time information of a start time of the received audio data of the second media data to be the calculated first end time or the calculated second end time of the first media data.

9. An electronic device comprising:
a communication interface for receiving first media data and second media data; and
a media sync module for identifying a first time of the first media data and a second time of the second media data, wherein the identified first time is a time when an output of one part among video data and audio data of the first media data which ends later ends, and the identified second time is a time when an output of one part among video data and audio data of the second media data which is received earlier starts,
modifying the identified second time of the second media data to be the identified first time of the first media data, and
combining the first media data and the second media data to output the one part of the second media data which is received earlier, at the modified second time upon the output of the one part of the first media data which ends later.

10. The electronic device of claim 9, wherein the media sync module modifies time information of the identified second time of the second media data to be time information of the identified first time of the first media data.

11. The electronic device of claim 9, wherein the media sync module calculates a first end time of the first media data when an output of the audio data of the first media data ends and a second end time of the first media data when an output of the video data of the first media data ends, and modifies time information of the identified second time of the second media data based on the calculated first end time or the calculated second end time.

12. The electronic device of claim 11, wherein the media sync module identifies the first time having a larger value among the first end time generated by adding an audio frame length to a start time of a last audio frame of the first media data and the second end time generated by adding a video frame length to a start time of a last video frame of the first media data.

13. The electronic device of claim 11, wherein the media sync module calculates an end time of a last video frame of the first media data when a video data length of the first media data is longer than or equal to an audio data length of the first media data.

14. The electronic device of claim 11, wherein the media sync module calculates an end time of a last audio frame of the first media data when an audio data length of the first media data is longer than or equal to a video data length of the first media data.

15. The electronic device of claim 11, wherein, when the video data of the second media data is first received, the media sync module modifies time information of a start time of the received video data of the second media data to be the calculated first end time or the calculated second end time of the first media data.

16. The electronic device of claim 11, wherein, when the audio data of the second media data is first received, the media sync module modifies time information of a start time of the received audio data of the second media data to be the calculated first end time or the calculated second end time of the first media data.

17. A non-transitory computer-readable storage medium for storing commands, the computer-readable recording medium recording a program for executing the operations of:
receiving first media data and second media data;
identifying a first time of the first media data and a second time of the second media data, wherein the identified first time is a time when an output of one part among video data and audio data of the first media data which ends later ends, and the identified second time is a time when an output of one part among video data and audio data of the second media data which is received earlier starts;
modifying the identified second time of the second media data to be the identified first time of the first media data; and
combining the first media data and the second media data to output the one part of the second media data which is received earlier, at the modified second time upon the output of the one part of the first media data, which ends later.

* * * * *